US012802432B2

(12) United States Patent
Gan et al.

(10) Patent No.: US 12,802,432 B2
(45) Date of Patent: Nov. 17, 2026

(54) METHOD FOR A TRAINING PORTRAIT DETECTION MODEL, PORTRAIT DETECTION METHOD, ELECTRONIC DEVICE, AND COMPUTER-READABLE STORAGE MEDIUM

(71) Applicant: Shenzhen Reolink Technology Co., Ltd., Shenzhen (CN)

(72) Inventors: Hao Gan, Shenzhen (CN); Qingjie Chen, Shenzhen (CN); Yanchong Chai, Shenzhen (CN)

(73) Assignee: Shenzhen Reolink Technology Co., Ltd., Shenzhen (CN)

( * ) Notice: Subject to any disclaimer, the term of this patent is extended or adjusted under 35 U.S.C. 154(b) by 202 days.

(21) Appl. No.: 18/811,008

(22) Filed: Aug. 21, 2024

(65) Prior Publication Data

US 2024/0412503 A1 Dec. 12, 2024

(30) Foreign Application Priority Data

Sep. 18, 2023 (CN) ......................... 202311212666.9

(51) Int. Cl.
*G06V 10/82* (2022.01)
*G06V 10/77* (2022.01)
*G06V 10/80* (2022.01)

(52) U.S. Cl.
CPC .......... *G06V 10/82* (2022.01); *G06V 10/7715* (2022.01); *G06V 10/806* (2022.01)

(58) Field of Classification Search
None
See application file for complete search history.

(56) References Cited

U.S. PATENT DOCUMENTS

2020/0134331 A1* 4/2020 Poddar .................... G06T 11/00
2021/0350177 A1* 11/2021 Zhou ..................... G06F 18/217
2022/0108130 A1* 4/2022 Cooper ................ G06V 10/772
2022/0108509 A1* 4/2022 Swaminathan ........... G06T 7/11
2023/0030419 A1* 2/2023 Wang ..................... G06V 10/80
2023/0031579 A1* 2/2023 Yu ...................... G06V 10/7715
2024/0095989 A1* 3/2024 Mallya .................. G06V 20/46

OTHER PUBLICATIONS

Jianglin Fu, Ivan V. Bajic, Rodney G. Vaughan. Datasets for face and object detection in fisheye images. Data Brief. Nov. 2, 2019;27: 104752. doi: 10.1016/j.dib.2019.104752. PMID: 31886334; PMCID: PMC6920438. (Year: 2019).*

* cited by examiner

*Primary Examiner* — Henok Shiferaw
(74) *Attorney, Agent, or Firm* — ScienBiziP, P.C.

(57) ABSTRACT

This application provides a method for training a portrait detection model, a portrait detection method, an electronic device, and a computer-readable storage medium. The portrait detection method is performed by utilizing a portrait detection model, and the portrait detection model is trained by acquiring at least one first image and at least one second image, acquiring a fused fisheye image from the first image and the second image, and training the portrait detection model by utilizing the fused fisheye image. The first image is a planar image including a portrait, and the second image is a fisheye image including a portrait. The fused fisheye image includes the portraits in the first image and the second image. The method is implemented by the electronic device and can improve the portrait detection accuracy using the portrait detection model.

19 Claims, 9 Drawing Sheets

METHOD FOR A TRAINING PORTRAIT DETECTION MODEL, PORTRAIT DETECTION METHOD, ELECTRONIC DEVICE, AND COMPUTER-READABLE STORAGE MEDIUM

TECHNICAL FIELD

This application relates to the technical field of artificial intelligent recognition, and more particularly relates to a method for training a portrait detection model, a portrait detection method, an electronic device, and a computer-readable storage medium.

BACKGROUND

With the development of artificial intelligence, portrait detection has been widely applied in various fields. Early portrait detection requires human assistance in recognition, resulting in relatively low efficiency. For the traditional portrait detection, a portrait detection model may be established by adopting a deep learning method, and automatic recognition is achieved by utilizing the portrait detection model, with higher detection efficiency.

However, there is some distortion in a portrait in a fisheye image, and currently, training for portrait recognition adopting the deep learning method is mostly based on a planar image, so that the portrait in the fisheye image is difficult to detect accurately.

SUMMARY

This application provides a method for training a portrait detection model, a portrait detection method, an electronic device, and a computer-readable storage medium.

In one aspect, this application provides a method for training a portrait detection model applied to an electronic device. The method includes: acquiring at least one first image and at least one second image, the first image being a planar image containing a portrait, and the second image being a fisheye image containing a portrait; acquiring a fused fisheye image from the first image and the second image, the fused fisheye image containing the portraits in the first image and the second image; and training the portrait detection model by utilizing the fused fisheye image, and storing the trained portrait detection model in a storage medium of the electronic device.

In another aspect, this application provides a portrait detection method applied to an electronic device. The portrait detection method includes: training a portrait detection model by utilizing the method for training a portrait detection model as described above, and performing portrait detection by using the trained portrait detection model.

In yet another aspect, this application provides an electronic device, which includes a memory and a processor. The memory is configured to store a computer program; and the processor is configured to execute the computer program stored in the memory to implement the portrait detection method.

In still another aspect, this application further provides a non-transitory computer-readable storage medium having a computer program stored thereon, wherein the computer program, when executed by one or more processors, cause the one or more processors to perform portrait detection by using a portrait detection model, which is trained by implementing the method for training a portrait detection model as described above.

In the method for training a portrait detection model of this application, the portrait detection model is trained by utilizing the fused fisheye image acquired from the first image and the second image, and as the fused fisheye image contains more abundant portraits than a conventional fisheye image, training samples for portrait detection may be enriched, so that the trained portrait detection model has better robustness, the problem of overfitting of the portrait detection model can be alleviated to a certain extent, and the portrait detection accuracy of the portrait detection model can be improved.

BRIEF DESCRIPTION OF THE DRAWINGS

The foregoing and/or additional aspects and advantages of this application will become apparent and be readily understood from the description of the embodiments in conjunction with the following accompanying drawings, in which.

DETAILED DESCRIPTION OF EMBODIMENTS

Figure 1:
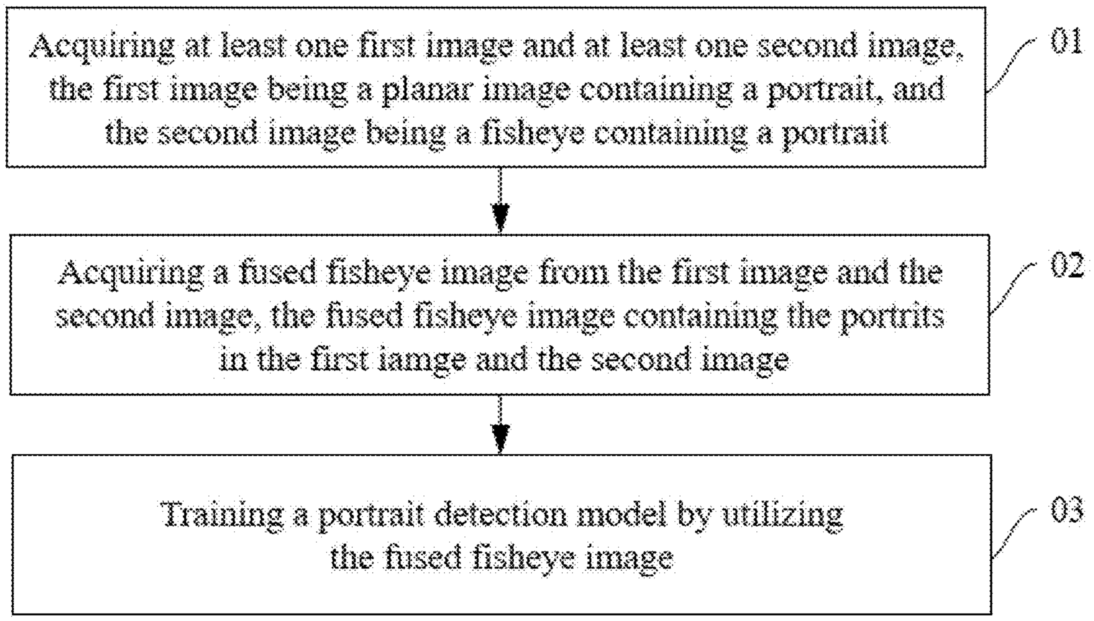
FIG. 1 is a schematic flowchart of a method for training a portrait detection model according to an embodiment of this application.

Embodiments of this application will be described in detail below, and examples of the embodiments are illustrated in the accompanying drawings, wherein same or similar reference numerals refer to same or similar elements, or elements with same or similar functions throughout the drawings. The embodiments described below with reference to the accompanying drawings are exemplary only to explain the embodiments of this application and should not be construed as limiting the embodiments of this application.

Currently, a portrait detection model is generally trained based on a planar image containing a portrait, so that the portrait with a certain degree of distortion in a fisheye image is difficult to detect accurately. Although the accuracy of detecting the portrait in the fisheye image by the portrait detection model may be improved by utilizing the fisheye image for training the portrait detection model, the problems of being difficult to label, difficult to adapt to an angle of the portrait by a labeling box, relatively long in time for acquiring a label, and the like, exist in training for the portrait detection model by using the fisheye image, resulting in difficulty in conveniently acquiring a large number of labeled fisheye images to construct a data set for training the portrait detection model, so that it is difficult to further improve the accuracy of portrait detection by the portrait detection model trained in the case of insufficient data.

FIG. 1 is schematic flowchart of a method for training a portrait detection model according to an embodiment of this application. In the embodiment, the trained portrait detection model may detect a portrait in a fisheye image more accurately. The method for training the portrait detection model is applied to an electronic device (such as a camera, a video camera, or a computer), and includes the following steps in detail.

- S01: acquiring at least one first image and at least one second image; The first image is a planar image containing a portrait, and the second image is a fisheye image containing a portrait.
- S02: acquiring a fused fisheye image from the first image and the second image; The fused fisheye image includes the portraits in the first image and the second image.
- S03: training the portrait detection model by utilizing the fused fisheye image, and storing the trained portrait detection model in a storage medium of the electronic device.

In the embodiment, the fisheye image may include images with a relatively large angle of field of view, such as a long-wide-angle image with an angle of field of view greater than 100°, a fisheye lens image, and a panoramic image. The portraits in such images often have barrel-shaped distortion to a certain extent, so that it is difficult to accurately detect the distorted portraits by utilizing the portrait detection model.

The fused fisheye image is an image simulating distortion of the fisheye image which is acquired by fusing the first image and the second image, and the fused fisheye image further has barrel-shaped distortion similar to that of the fisheye image on the basis of containing the portrait. Based on this, the portrait detection model may be trained by utilizing the fused fisheye image for simulating the conventional fisheye image.

On the one hand, the fused fisheye image includes the portraits in the first image and the second image, namely includes more portrait objects than the second image, which is more conducive to enriching training samples for portrait detection compared with the mode of training the portrait detection model by adopting the fisheye image. The trained portrait detection model has better robustness, and may alleviate the problem of overfitting of the portrait detection model to a certain extent.

On the other hand, portrait labeling in the fisheye image is more complex and takes longer time than portrait labeling in the planar image. In the fused fisheye image acquired by utilizing the first image and the second image, labeling of a part of the portraits originates from the second image, and labeling of a part of the portraits originates from the first image, so that an average labeling time of each portrait in the fused fisheye image is shorter than a labeling time of the portrait in the conventional fisheye image, so that the efficiency of model training may be improved.

In summary, in the method for training the portrait detection model according to the embodiment of this application, the portrait detection model is trained by utilizing the fused fisheye image acquired from the first image and the second image, as the fused fisheye image includes more abundant portraits than the conventional fisheye image, the training samples for portrait detection may be enriched, so that the trained portrait detection model has better robustness, the problem of overfitting of the portrait detection model may be alleviated to a certain extent, and the accuracy of portrait detection of the portrait detection model may be improved.

Figure 2:
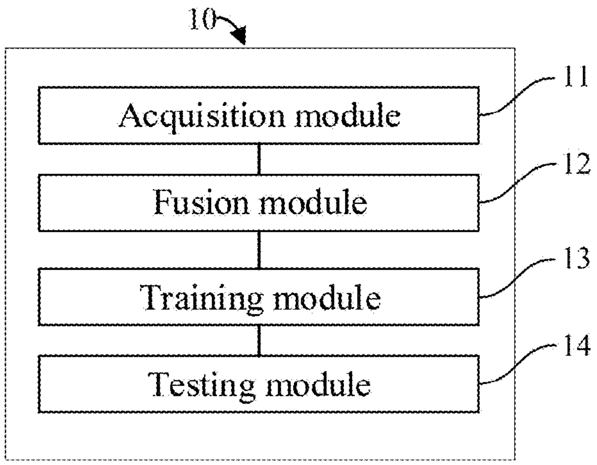
FIG. 2 is a schematic structural diagram of an apparatus for training a portrait detection model according to an embodiment of this application.

Referring to FIG. 2, an embodiment of this application further provides an apparatus 10 for training a portrait detection model. The apparatus 10 for training the portrait detection model is capable of executing the steps in S01, S02, and S03 of the above-described method for training the portrait detection model, so that the trained portrait detection model may detect the portrait in the fisheye image more accurately.

The apparatus 10 for training the portrait detection model includes an acquisition module 11, a fusion module 12 and a training module 13. The acquisition module 11 is configured for executing the step in S01 of the method, the fusion module 12 is configured for executing the step in S02 of the method, and the training module 13 is configured for executing the step in S03 of the method. Namely, the acquisition module 11 is configured to acquire at least one first image and at least one second image, wherein the first image is a planar image containing a portrait, and the second image is a fisheye image containing a portrait. The fusion module 12 is configured to acquire a fused fisheye image from the first image and the second image, wherein the fused fisheye image includes the portraits in the first image and the second image. The training module 13 is configured to train the portrait detection model by utilizing the fused fisheye image.

The method for training the portrait detection model of this application will be further described with reference to the accompanying drawings.

In the conventional fisheye image, relatively large imaging distortion generally exists at a central position of the fisheye image, while relatively small imaging distortion exists at a peripheral position outside an edge of the fisheye image, and the imaging distortion degree of the portrait object at the peripheral position of the fisheye image is similar to the imaging distortion degree in the planar image. Therefore, when the fisheye image is simulated by utilizing the first image and the second image to acquire the fused fisheye image, the portrait in the first image may be provided at the peripheral position of the fused fisheye image, and the portrait in the second image may be provided at a position near the center of the fused fisheye image, so that the fused fisheye image may better simulate the distortion of the conventional fisheye image and contain more portrait objects.

Based on this, in the embodiment, the step S02 of the method for training the portrait detection model: acquiring a fused fisheye image from the first image and the second image, the fused fisheye image including the portraits in the first image and the second image, and the step S02 includes:

- S021: acquiring a preset fisheye area, the preset fisheye area including an annular area and a circular area, and the circular area being inscribed on an inner circumference of the annular area;
- S022: mapping the first image to the annular area to acquire an annular image;
- S023: mapping the second image to the circular area to acquire a circular image; and

S024: acquiring the fused fisheye image from the annular image and the circular image.

In conjunction with FIG. 2, the fusion module 12 may further be configured for executing the methods in S021, S022, S023, and S024. Namely, the fusion module 12 is configured to acquire the preset fisheye area, wherein the preset fisheye area includes the annular area and the circular area, and the circular area is inscribed on the inner circumference of the annular area. The fusion module 12 *f* is further configured to map the first image to the annular area to acquire the annular image, map the second image to the circular area to acquire the circular image, and acquire the fused fisheye image from the annular image and the circular image.

Figure 3:
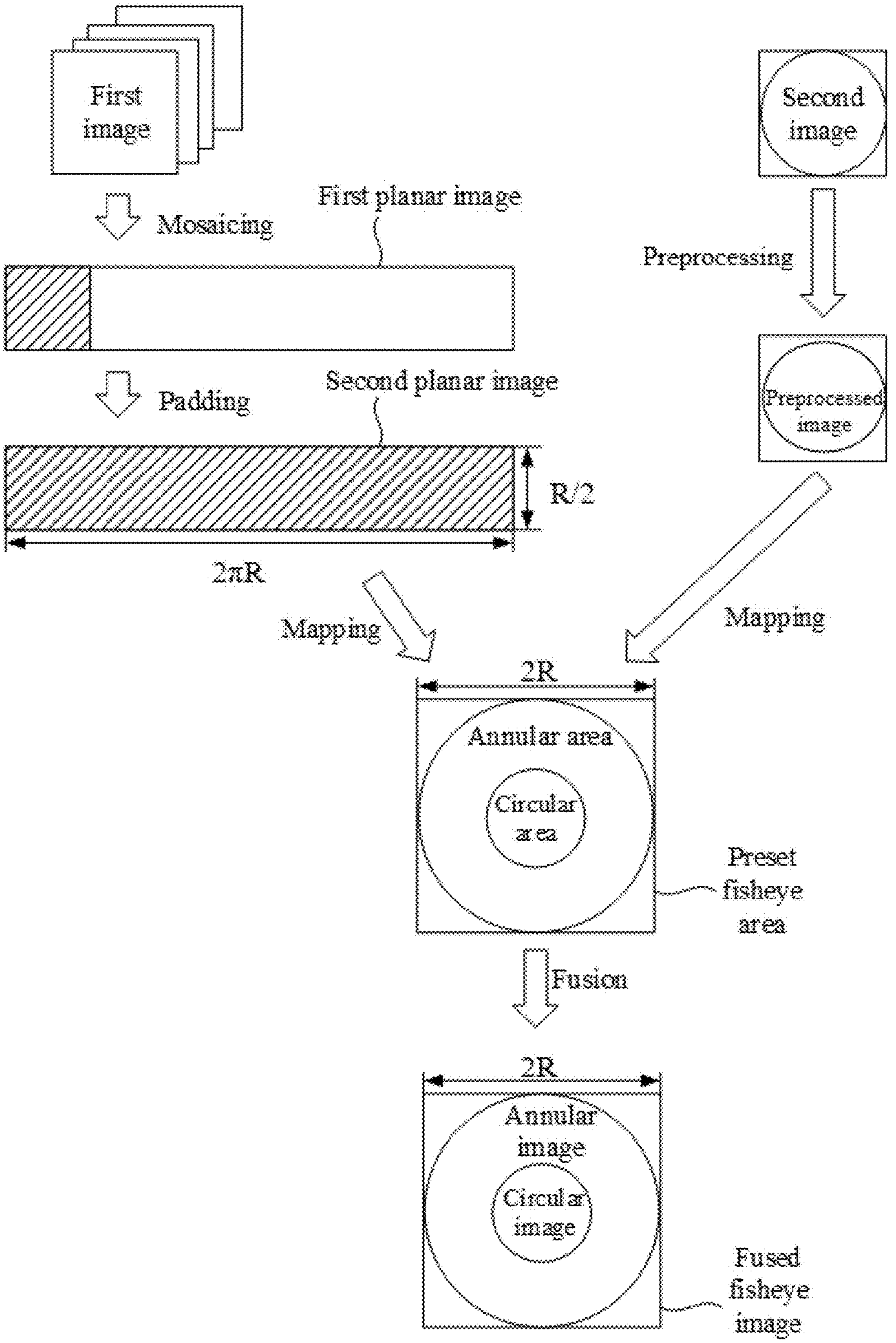
FIG. 3 is a schematic scene diagram of acquiring a fused fisheye image according to an embodiment of this application.

Referring to FIG. 3, the peripheral position of the preset fisheye area is the annular area, the position of the annular area in the fused fisheye image is padded with the annular image formed by mapping the first image, and the imaging distortion of the annular image is relatively close to the imaging distortion of an outer ring position of the conventional fisheye image, so as to utilize the curved planar image as the peripheral position of the fused fisheye image for simulating the conventional fisheye image. The position near the center of the preset fisheye area is the circular area, and the position of the circular area in the fused fisheye image is padded with the circular image formed by mapping the second image, so that the imaging distortion of the conventional fisheye image exists at the position near the center of the fused fisheye image. In this way, the overall imaging distortion of the fused fisheye image is closer to the imaging distortion of the conventional fisheye image.

In the embodiment, the circular area is inscribed on an inner circumference of the annular area, and accordingly, the circular image is inscribed on an inner circumference of the annular image to form the fused fisheye image with the annular image. In this way, in the fused fisheye image, there is no area which is not padded with pixels between the annular image and the circular image, thereby reducing an invalid training area in the fused fisheye image.

Mapping the first image to the annular area refers to mapping pixels of the first image to the annular area. The number of the mapped first images may be one, two, three, four, five or more, which is not enumerated herein. Similarly, mapping the second image to the circular area refers to mapping pixels of the second image to the circular area. The number of the mapped second images may be one, two, three, four, five or more, which is not enumerated herein.

In one example, a range of the annular area and a range of the circular area are determined by the size of the fused fisheye image. Assuming that a diameter of the fused fisheye image is 2R, and a minimum circumscribed rectangle of the fused fisheye image is a rectangle with a side length of 2R, accordingly, the preset fisheye area may be set as a rectangular area with a side length of 2R, so that the preset fisheye area may include a circular range with a diameter of 2R.

In the embodiment, the step S022 of mapping the first image to the annular area to acquire an annular image, includes:

S0221: providing a first planar image, the first planar image being rectangular;

S0222: mosaicing a plurality of first images into the first planar image to acquire a second planar image, the second planar image including a first portrait labeling box; and

S0223: performing coordinate conversion on pixels of the second planar image according to coordinate mapping equations to acquire the annular image, the annular image including a second portrait labeling box.

In conjunction with FIG. 2, the fusion module 12 may also be configured for executing the methods in steps S0221, S0222, and S0223. Namely, the fusion module 12 is configured to provide the first planar image, and mosaic a plurality of first images into the first planar image to acquire the second planar image, wherein the second planar image includes the first portrait labeling box. The fusion module 12 is further configured to perform coordinate conversion on pixels of the second planar image according to coordinate mapping equations to acquire the annular image, the annular image including the second portrait labeling box.

Figure 4:
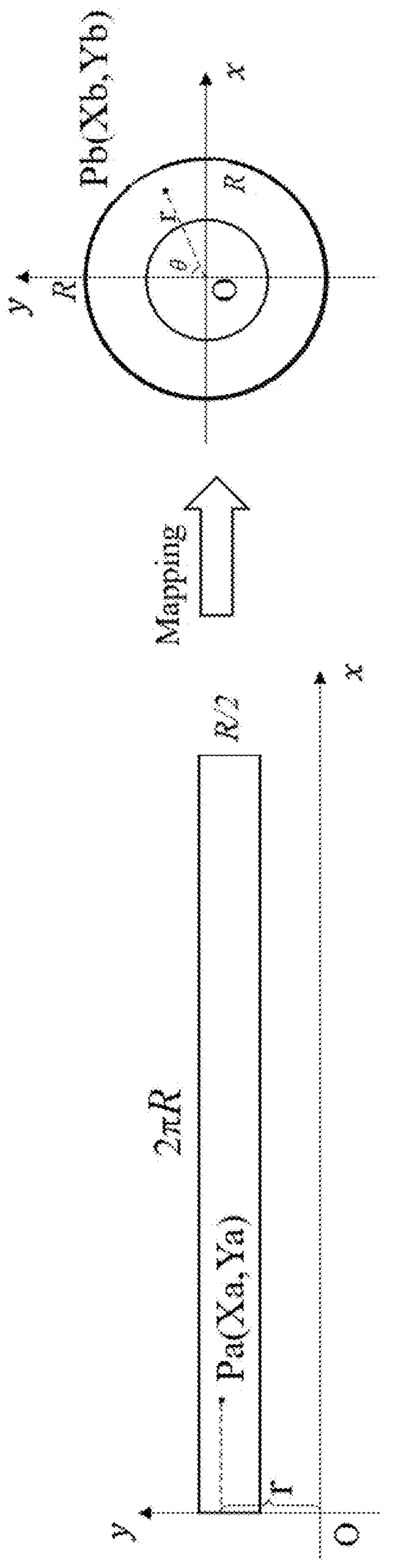
FIG. 4 is a schematic scene diagram of mapping a first image into an annular image according to an embodiment of this application.

Referring to FIG. 4, in order to map the first image to the annular area, the first planar image having a rectangular shape may be correspondingly set according to the size of the annular area to acquire the second planar image having a rectangular shape, and then the second planar image is curved into an annular shape to obtain the annular image. Assuming that the diameter of the outer ring of the annular area is 2R and the diameter of the circular area is R, the width of the ring of the annular area is R/2, the circumference of the outer ring of the annular area is 2πR, and the width of the correspondingly set first planar image is 2πR and the height is R/2.

In one example, when a plurality of first images are padded to a rectangular area with a width of 2πR and a height of R/2, each first image may be adjusted to an image with a height of R/2 by means of scaling, clipping, and the like, then one of the first images is padded to the leftmost end of the area which is not padded with an image in the rectangular area, then the next first image is padded to the leftmost end of the area which is not padded with an image currently in the rectangular area, and thus the first images are padded repeatedly until the rectangular area is completely padded. If the width of the last first image to be padded is greater than the width of the area which is not padded with an image currently, the width of the last first image to be padded may be adaptively clipped, so that the width of the last first image to be padded is the same as the width of the area which is not padded with an image currently, thereby preventing the last first image to be padded from crossing a boundary of the rectangular area after being padded.

After acquiring the second planar image, coordinate conversion may be performed on pixel coordinates of the second planar image according to preset coordinate mapping equations to acquire coordinates corresponding to the pixels of the second planar image in the annular area, so as to map the pixels of the second planar image to the annular area to obtain the annular image. Assuming that the coordinate of a certain pixel point Pa in the rectangular padded image is (Xa, Ya), and the coordinate of the corresponding pixel point Pb formed by mapping the pixel point Pa into the annular image is (Xb, Yb), the coordinate of the pixel point Pb (Xb, Yb) may be calculated according to the following Equation 1 and Equation 2.

$$Xb = r\cos\left(\frac{\pi}{2} - \theta\right); \quad \text{Equation 1}$$

$$Yb = r\sin\left(\frac{\pi}{2} - \theta\right); \quad \text{Equation 2}$$

$$\theta = \frac{Xa}{2\pi R}2\pi = \frac{Xa}{R}; \text{ and} \quad \text{Equation 3}$$

$$r = Ya; \quad \text{Equation 4}$$

where "θ" represents a mapping polar angle, "r" represents a mapping polar radius, and "R" represents a radius of the fused fisheye image. In this way, the mapping of the first image to the annular image is simple in calculation and high in mapping efficiency.

In the above example, the mapping mode of the first image is described by an example in which the diameter of the outer ring of the annular area is 2R and the diameter of the circular area is R. In other examples, the size ratio of the annular area to the circular area in the preset fisheye area may be set as desired.

Figure 5:
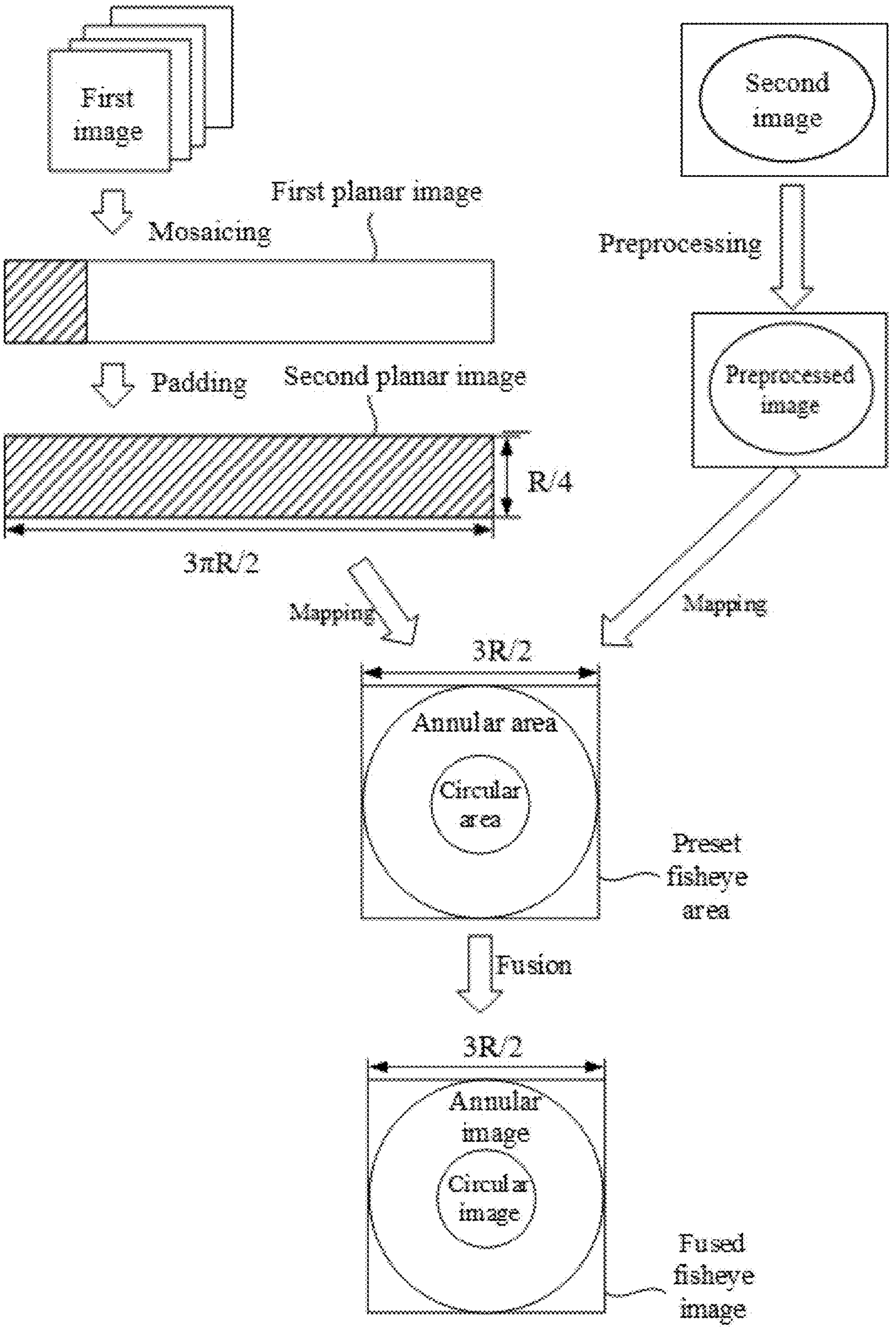
FIG. 5 is another schematic scene diagram of acquiring the fused fisheye image according to an embodiment of this application.

Referring to FIG. 5, in yet another example, assuming that the diameter of the outer ring of the annular area is 3R/2 and the diameter of the circular area is R, the ring width of the annular area is R/4 and the circumference of the outer ring of the annular area is 3πR/2. Accordingly, when acquiring the annular image, a plurality of first images may be padded into a rectangular area with a width of 3πR/2 and a height of R/4 to acquire a rectangular padded image, and then the rectangular padded image is curved and the annular image is padded into the annular area.

By analogy, assuming that the width of the constructed rectangular area is "w" and the height is "h", for an annular area with a diameter of an outer ring of $2\mu_2R$ and a diameter of an inner ring of $2\mu_1R$, a rectangular area with a width w of $w=\mu_2-\mu_1$ and a height h of $h=2\pi\mu_2R$ may be constructed, so that after the image is padded into the rectangular area, the image may be mapped to an annular image with the diameter of the outer ring of $2\mu_2R$ and the diameter of the inner ring of $2\mu_1R$ according to the above-described Equation 1 and Equation 2, where $0<\mu_1<\mu_2<R$. In this way, for an annular area with any ring width and the diameter of the outer ring which does not exceed 2R, a matching rectangular area may be constructed.

In the embodiment, the step S023 of mapping the second image to the circular area to acquire a circular image, includes:

S0231: preprocessing the second image to acquire a preprocessed image, a size of the preprocessed image being the same as a size of the circular area, and the preprocessing including scaling and clipping; and S0232: mosaicing the preprocessed image to the circular area to acquire the circular image.

In conjunction with FIG. 2, the fusion module 12 may also be configured for executing the methods in steps S0231 and S0232. Namely, the fusion module 12 is configured to preprocess the second image to acquire the preprocessed image, wherein the size of the preprocessed image is the same as the size of the circular area, and the preprocessing includes scaling and clipping. The fusion module 12 is configured to mosaic the preprocessed image to the circular area to acquire the circular image.

Referring to FIG. 3, if the size of the second image is the same as the size of the circular area, the second image may be directly mosaiced to the circular area to obtain the circular image. If the size of the second image is different from the size of the circular area, a preprocessed image having the same size as the circular area may be acquired by preprocessing the second image, and then the preprocessed image is mosaiced to the circular area to acquire the circular image, wherein the preprocessing step includes processing modes such as scaling, clipping, splicing, and rotating, and is not limited herein. Furthermore, in the case where the size of the second image is the same as the size of the circular area, an angle of the second image may also be adjusted by the processing mode of rotating in the preprocessing step, and then the second image with the adjusted angle is mosaiced to the circular area to acquire the circular image.

Referring to FIG. 3, in one example, only one second image may be mapped to the circular area to acquire the circular image. In this way, the number of portraits to be labeled in the fisheye image may be reduced, and the efficiency of training the portrait detection model may be improved. For example, in the case where a valid area (an area having pixels) of the second image is circular, the pixels of the valid area of the second image may be adjusted to the same range as the circular area by means of scaling, clipping, and the like to be padded to the circular area to form the circular image. If the valid area of the second image is non-circular, the circular area may be cropped in the valid area of the second image, and the pixels of the cropped circular area may be padded to the circular area or the cropped circular area is scaled and then padded to the circular area to form the circular image.

Figure 6:
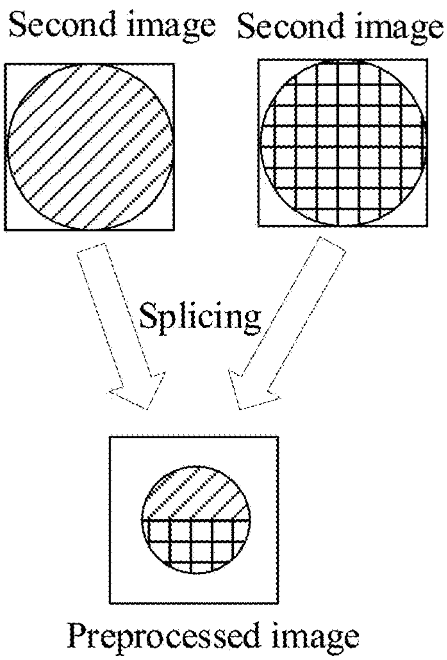
FIG. 6 is a schematic scene diagram of acquiring a spliced image according to an embodiment of this application.

Referring to FIG. 6, in yet another example, a plurality of second images may be spliced into one preprocessed image, and then the preprocessed image is mapped to the circular area to acquire the circular image. In this way, there are more portraits in the preprocessed image, which may increase the number of portraits with fisheye image type distortion in the fused fisheye image and enrich the training samples for portrait detection. For example, one second image includes a portrait only in the upper half, and the upper half of the second image is cropped; the other second image includes a portrait only in the lower half, and the lower half of the second image is cropped; and the cropped upper half and lower half images are spliced into a preprocessed image to acquire the preprocessed image with more portraits.

Referring to FIG. 3, the ratio of the diameter of the circular area to the diameter of the outer ring of the annular area is in the range of [0.50, 0.75]. Assuming that the diameter of the circular area is R1 and the diameter of the outer ring of the annular area is R2, the range of R1/R2 is [0.50, 0.75], for example, values of R1/R2 may be 0.50, 0.55, 0.60, 0.65, 0.70, 0.75, and the like, which are not enumerated herein. The smaller the ratio of R1/R2 is, the smaller the proportion of the circular image in the fused fisheye image is, and the larger the proportion of the annular image is, wherein the annular image is formed by mapping a plurality of first images which are spliced, and the annular image contains more portrait objects than the circular image. In the fused fisheye image, the larger the proportion of the annular image is, the larger the proportion of the portrait objects in the fused fisheye image is, so that the portrait detection model is more likely to be guided to detect the portrait in the fused fisheye image. The larger the ratio of R1/R2 is, the larger the proportion of the circular image in the fused fisheye image is, and the smaller the proportion of the annular image is. In the fused fisheye image, the larger the proportion of the fisheye image is, the larger the proportion of fisheye distortion in the fused fisheye image is, so that the portrait detection model is more likely to be guided to detect the portrait in the fisheye distorted image.

Figure 7:
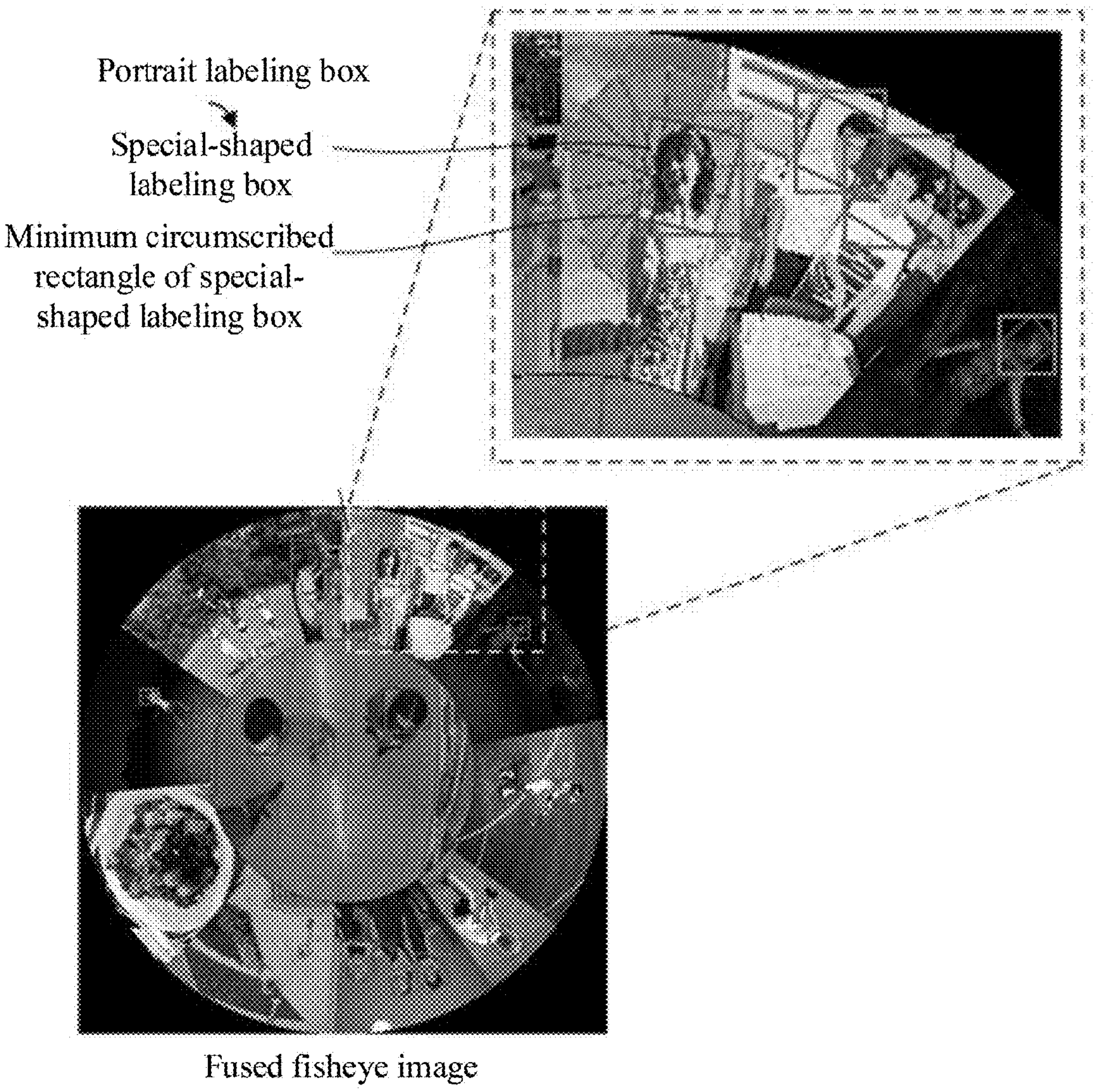
FIG. 7 is a schematic diagram of a special-shaped labeling box of the fused fisheye image according to an embodiment of this application.

Referring to FIG. 7, the portraits in the first image and the second image all have been labeled with portrait labeling boxes to facilitate subsequent training and verification of the portrait detection model. For example, the portrait labeling box is a square box containing the head and shoulders of the portrait. The square box refers to a labeling box with a width direction being a horizontal direction and a height direction being a vertical direction. A calculation mode of labeling with the square box is relatively mature and relatively convenient in labeling process, a calculation technology of Intersection over Union (IoU) of the square box is relatively mature, and calculation is easy to perform quickly and accurately, so that the efficiency of training for the portrait detection model may be improved. The range between the head and shoulders of the portrait contains most of the features of the portrait, on the one hand, the head and shoulders may be basically taken into the picture by a fisheye lens, and shapes of the head and shoulders in the fisheye image are in the planar image.

Moreover, the range between the head and shoulders is close to the rectangle, and when the head and shoulders are labeled by using the square boxes, the head and shoulders of the portrait may not overtilt relative to the square boxes, so as to prevent introducing excessive background information into the square boxes.

When the second image is mapped to the circular image, if the mapping is performed in a clipping manner, the shape and size of the portrait in the second image before the mapping are the same as the shape and size of the portrait in the circular image after the mapping, and in this case, the shape and size of the square box corresponding to the portrait in the circular image also remain the same as the shape and size of the square box corresponding to the portrait in the second image. If the mapping is performed in a scaling manner, the shape of the portrait in the second image before the mapping is the same as the shape of the portrait in the circular image after the mapping, and the size is scaled by a corresponding scaling magnification. In this case, the shape of the square box corresponding to the portrait in the circular image is the same as the shape of the square box corresponding to the portrait in the second image, and the size is also scaled by a corresponding scaling magnification.

Figure 8:
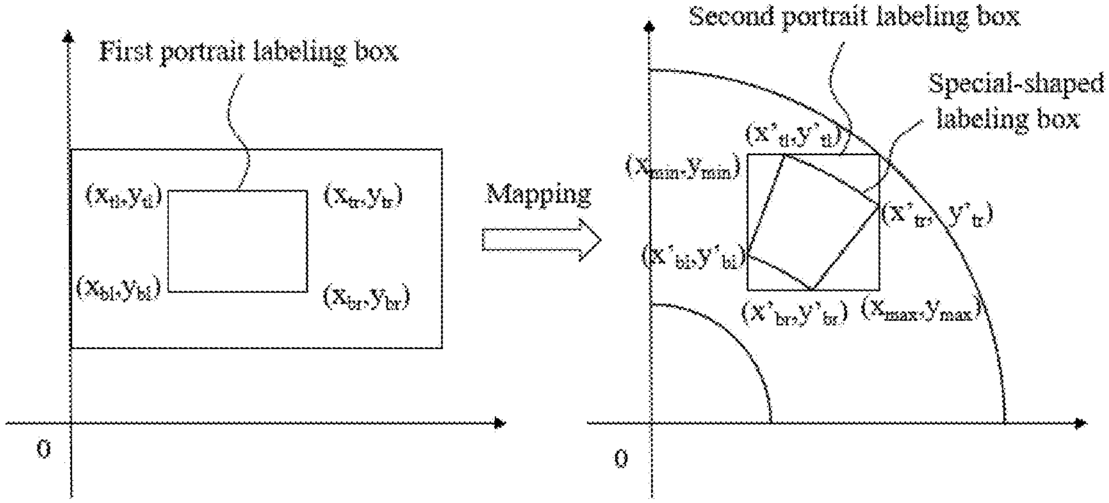
FIG. 8 is a schematic scene diagram of mapping a first portrait labeling box into a second portrait labeling box according to an embodiment of this application.

In conjunction with FIG. 7 and FIG. 8, assuming that the portrait is labeled with the first portrait labeling box in the first image, the first portrait labeling box is the square box. When the first image is mapped to the annular image, the first portrait labeling box will be mapped to a non-rectangular special-shaped labeling box. For example, the coordinates of four angular points of a certain first portrait labeling box in the first image are $(x_{tl}, y_{tl})$, $(x_{tr}, y_{tr})$, $(x_{bl}, y_{bl})$ and $(x_{br}, y_{br})$, respectively, according to the above-described Equation 1 and Equation 2, the coordinates corresponding to the four angular points after being mapped to the annular area are $$(x'_{tl}, y'_{tl}),\ (x'_{tr}, y'_{tr}),\ (x'_{bl}, y'_{bl}) \text{ and } (x'_{br}, y'_{br}),$$

respectively, and enclose to form the special-shaped labeling box. Compared with the square box, a labeling flow of the special-shaped labeling box is relatively complex, and rotating angles of the special-shaped labeling boxes at different positions in the overall annular area relative to the square box are unstable, so that there may be special-shaped labeling boxes at various angles, and IoU values corresponding to the special-shaped labeling boxes at different positions may change greatly during the subsequent IoU calculation, which may require more rounds of training and take more training time.

Based on this, in the method for training the portrait detection model, step S0223: performing coordinate conversion on pixels of the second planar image according to coordinate mapping equations to acquire the annular image, includes:

S02231: acquiring a first angular point coordinate, the first angular point coordinate representing an angular point of the first portrait labeling box;

S02232: performing coordinate conversion on the first angular point coordinate according to the coordinate mapping equations to acquire a second angular point coordinate;

S02233: acquiring a special-shaped labeling box according to the second angular point coordinate; and

S02234: acquiring the second portrait labeling box according to a minimum circumscribed rectangle of the special-shaped labeling box.

In conjunction with FIG. 2, the fusion module 12 may also be configured for executing the methods in the steps S02231, S02232, S02233, and S02234. Namely, the fusion module 12 is configured to acquire the first angular point coordinate, wherein the first angular point coordinate represents the angular point of the first portrait labeling box. The fusion module 12 is configured to perform coordinate conversion on the first angular point coordinate according to the coordinate mapping equations to acquire the second angular point coordinate, acquire the special-shaped labeling box according to the second angular point coordinate, and acquire the second portrait labeling box according to the minimum circumscribed rectangle of the special-shaped labeling box.

Referring to FIG. 7 and FIG. 8, after the first image is mosaiced to the first planar image to obtain the second planar image, the portrait labeling box in the first image is also mosaiced to the second planar image to become the first portrait labeling box in the second planar image. When the second planar image is curved into a curved image, the first portrait labeling box is also correspondingly curved to form a special-shaped labeling box. A calculation mode of the IoU of the special-shaped labeling box is relatively difficult and needs to consume more calculation resources, and the special-shaped labeling box is easy to introduce more background information, resulting in relatively reduced portrait information in the special-shaped labeling box, and a calculation mode of the IoU of the square box is relatively mature and not easy to introduce background information. The minimum circumscribed rectangle of the special-shaped labeling box is a square box, and the head and shoulders of the portrait may be still contained in the range of the minimum circumscribed rectangle of the special-shaped labeling box. Therefore, the minimum circumscribed rectangle of the special-shaped labeling box may be taken as the second labeling box for labeling the portrait in the annular image.

For example, the coordinates of the first angular points corresponding to the four angular points of the first portrait labeling box are $(x_{tl}, y_{tl})$, $(x_{tr}, y_{tr})$, $(x_{bl}, y_{bl})$ and $(x_{br}, y_{br})$, respectively, and the coordinates of the first angular points may be converted into the second angular point coordinates according to Equation 1 and Equation 2 of the coordinate mapping equations, and the coordinates of the four angular points of the special-shaped labeling box are $$(x'_{tl}, y'_{tl}),\ (x'_{tr}, y'_{tr}),\ (x'_{bl}, y'_{bl}) \text{ and } (x'_{br}, y'_{br}),$$

respectively. An upper left angular coordinate of the minimum circumscribed rectangle of the special-shaped labeling box is set to be $(x_{min}, y_{min})$, a lower right angular coordinate of the minimum circumscribed rectangle is set to be $(x_{max},$ $y_{max}$), and then $x_{min}$, $y_{min}$, $x_{max}$ and $y_{max}$ may respectively be calculated by the following Equations 5:

$$x_{min}=\min(x'_{tl}, x'_{tr}, x'_{bl}, x'_{br});\quad \text{Equation 5}$$

$$y_{min}=\min(y'_{tl}, y'_{tr}, y'_{bl}, y'_{br});$$

$$x_{max}=\max(x'_{tl}, x'_{tr}, x'_{bl}, x'_{br}); \text{ and}$$

$$y_{max}=\max(y'_{tl}, y'_{tr}, y'_{bl}, y'_{br}).$$

After respectively acquiring the upper left angular coordinate ($x_{min}$, $y_{min}$) and the lower right angular coordinate ($x_{max}$, $y_{max}$) of the minimum circumscribed rectangle of the special-shaped labeling box, a rectangular box generated according to the upper left angular coordinate ($x_{min}$, $y_{min}$) and the lower right angular coordinate ($x_{max}$, $y_{max}$) is the minimum circumscribed rectangle of the special-shaped labeling box, namely, the second portrait labeling box.

In one example, the coordinates [($x_{min}$, $y_{min}$), ($x_{max}$, $y_{max}$)] of the minimum circumscribed rectangular box may also be directly taken as a label of the planar image for output.

In the embodiment, the portrait detection model includes a pre-constructed portrait detection network, and the portrait detection network includes, but is not limited to, convolution neural networks such as an R-CNN network, a YOLO network, and a Detr network. In the method for training the portrait detection model, the step S03 of training the portrait detection model by utilizing the fused fisheye image, includes:

S031: in a round of training, inputting the fused fisheye image into the portrait detection network to acquire a training feature map, acquiring training loss according to the training feature map, and calculating an updated weight value according to the training loss, the updated weight value being a weight parameter of a convolution kernel in the portrait detection network;

S032: if a number of training rounds is less than a preset number of rounds, updating a preset weight value of the portrait detection network according to the updated weight value to acquire an updated portrait detection network, and performing a new round of training by utilizing the new fused fisheye image and the updated portrait detection network; and

S033: if the number of training rounds is greater than or equal to the preset number of rounds, using the latest updated weight value as an object weight value of the portrait detection network to output the trained portrait detection network.

In conjunction with FIG. 2, the training module 13 may also be configured for executing the methods in the steps S031, S032, and S033. Namely, in a round of training, the training module 13 is configured to input the fused fisheye image into the portrait detection network to acquire the training feature map, acquire training loss according to the training feature map, and calculate the updated weight value according to the training loss. If the number of training rounds is less than the preset number of rounds, updating the preset weight value of the portrait detection network according to the updated weight value to acquire the updated portrait detection network, and performing a new round of training by utilizing the new fused fisheye image and the updated portrait detection network. Otherwise, if the number of training rounds is greater than or equal to the preset number of rounds, using the latest updated weight value as the object weight value of the portrait detection network to output the trained portrait detection network.

The portrait detection network initially has a preset weight value, during the first round of training, the fused fisheye image is input into the portrait detection network, the training feature map is acquired based on the preset weight value, and the training loss is calculated according to the training feature map. According to the training loss, a new weight value may be calculated by means of back propagation, namely, an updated weight value is calculated, and after updating the preset weight value of the portrait detection network by utilizing the updated weight value, a round of training is completed.

In the subsequent rounds of training, new fused fisheye images are continuously utilized for being input into the portrait detection network to acquire a new training feature map based on the latest updated weight value, so as to calculate new training loss according to the training feature map, and acquire an updated weight value of the current round according to the newly calculated training loss in the current round of training. If the number of training rounds is less than the preset number of rounds, after updating the preset weight value by utilizing the updated weight value, a new fused fisheye image is continued to be input into the updated portrait detection network for a new round of training. If the number of training rounds is greater than or equal to the preset number of rounds, the latest updated weight value acquired in the latest training round is taken as the object weight value of the portrait detection network to update the portrait detection network, and the updated portrait detection network is taken as the trained portrait detection network for output.

Figure 9:
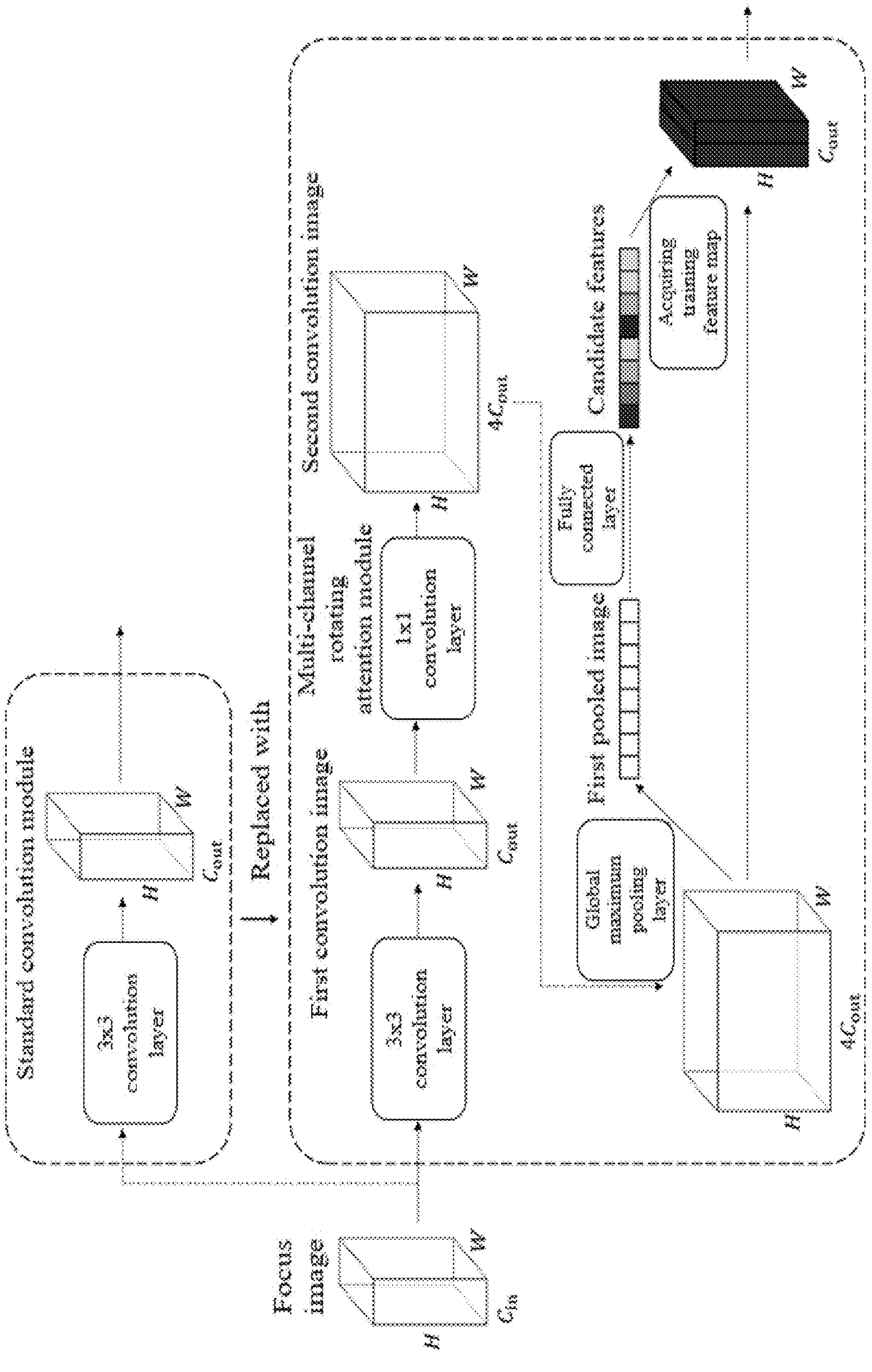
FIG. 9 is a schematic diagram of a multi-channel rotating attention module of a portrait detection network according to an embodiment of this application.

Referring to FIG. 9, in one example, the portrait detection network may adopt YOLOv5s as a backbone, and all convolution layers in the YOLOv5s network except a focus layer are replaced with multi-channel rotating attention modules. The multi-channel rotating attention module consists of a depthwise separable convolution layer, a first-order convolution layer, a global maximum pooling layer and a fully connected layer, wherein a convolution kernel of the depthwise separable convolution layer has a size of 3×3, the number of groups of 4, and a stride of 1; and a convolution kernel of the first-order convolution layer has a size of 1×1, and a stride of 1, with the number of output channels 4 times the number of input channels. In this way, the number of channels of the backbone is increased by utilizing the depthwise separable convolution layer and the first-order convolution layer, and the increase in the number of channels is more advantageous for the portrait detection network to learn portrait features at different angles, so that the portrait detection network has the learning ability for rotated portrait features by learning the portrait features at different angles. Moreover, based on the characteristics of the depthwise separable convolution layer, the number of parameters required for convolution calculation may be reduced on the basis of increasing the number of channels, so that excessive additional parameters introduced by increasing the number of channels may be avoided.

Based on the above YOLOv5s network, in the method for training the portrait detection model, the step S031 of inputting the fused fisheye image into the portrait detection network to acquire a training feature map, includes:

S0311: inputting the fused fisheye image into the focus layer to acquire a focus image;

S0312: inputting the focus image into the depthwise separable convolution layer to acquire a first convolution image;

S0313: inputting the first convolution image into the first-order convolution layer to acquire a second convolution image, a number of channels of the second convolution image being greater than a number of channels of the focus image;

S0314: inputting the second convolution image into the global maximum pooling layer to acquire a first pooled image;

S0315: inputting the first pooled image into the fully connected layer to acquire a plurality of candidate features; and S0316: acquiring the training feature map according to the candidate feature with a maximum attention weight among the plurality of candidate features.

In conjunction with FIG. 2, the training module 13 may also be configured for executing the methods in steps S0311, S0312, S0313, S0314, S0315, and S0316. Namely, the training module 13 is configured to input the fused fisheye image into the focus layer to acquire the focus image, and input the focus image into the depthwise separable convolution layer to acquire the first convolution image. The training module 13 is further configured to input the first convolution image into the first-order convolution layer to acquire the second convolution image, where a number of channels of the second convolution image is greater than a number of channels of the focus image. The training module 13 is further configured to input the second convolution image into the global maximum pooling layer to acquire the first pooled image, input the first pooled image into the fully connected layer to acquire a plurality of candidate features, and acquire the training feature map according to the candidate feature with the maximum attention weight among the plurality of candidate features.

The "image" concept in the focus image, the first convolution image, the second convolution image, and the first pooled image in the above steps S0311, S0312, S0313, S0314, S0315 and S0316 refers to a pixel processing result of the convolution layer and the pooling layer, for example, the "first convolution image" refers to the pixel processing result output after processing by the depthwise separable convolution layer, and does not mean an actually existing image.

The focus layer of the YOLOv5s network is configured for performing down-sampling processing on the fused fisheye image to a certain degree to output the focus image, so as to reduce the parameters and calculation amount of the portrait detection model and increase the receptive field simultaneously, thereby increasing the calculation efficiency and speed of the portrait detection model, and improving the precision and recall of the portrait detection model.

The convolution kernel of the depthwise separable convolution layer has a size of 3×3, the number of groups of 4, and a stride of 1, and the number of channels of the input focus image may be expanded by a factor of 4 to obtain 4 groups of first convolution images; and then the first-order convolution layer with the convolution kernel having a size of 1×1 and a stride of 1 is utilized for outputting the second convolution image according to the input 4 groups of first convolution images, 4 groups of first images may be integrated into one group of second convolution images with the number of channels being four times the focus image, so as to enhance the learning ability of the portrait detection network for the rotated features. In this example, the number of groups of the depthwise separable convolution layer is 4, so that the number of channels of the acquired second convolution image is 4 times the number of channels of the focus image. In other examples, the number of groups of the depthwise separable convolution layer may be other integers greater than one, so that the number of channels of the acquired second convolution image is greater than the number of channels of the focus image, namely, the learning ability of the portrait detection network for the rotated features may be enhanced.

The global maximum pooling layer outputs the first pooled image according to the input second convolution image, and compared with an average pooling layer, adopting the global maximum pooling layer for pooling processing is easier to retain portrait features. The fully connected layer outputs a plurality of candidate features according to the input first pooled image, the candidate feature with the maximum attention weight among the plurality of candidate features participates in the subsequent calculation of a neck module (i.e., neck) and a head module (i.e., head) in the portrait detection model, and the neck module and the head module output the training feature map according to the input candidate feature with the maximum weight, wherein the attention weight may be configured based on the rotated portrait features, in this way, the candidate feature with the maximum attention weight is selected from the plurality of candidate features to participate in the subsequent calculation, so that the number of channels previously expanded in the depthwise separable convolution layer and the first-order convolution layer may be compressed, more rotated features may be retained, and then the retained candidate feature has rotation invariance.

In the embodiment, in step S031: acquiring training loss according to the training feature map, and calculating an updated weight value according to the training loss is that the updated weight value is calculated by a back propagation algorithm to update a preset weight of the portrait detection network by the updated weight value.

In one example, the training loss includes object loss, class loss, and a detection box loss. The object loss and the class loss may be calculated by adopting a Binary Cross Entropy (BCE) loss function. For example, the object loss is set to be $L_{obj}$, the class loss is set to be $L_{cls}$, and the detection box loss is set to be $L_{box}$. The object loss $L_{obj}$ and the class loss $L_{cls}$ may respectively be calculated by Equation 3 and Equation 4 as follows.

$$L_{obj} = y_{obj} \cdot \log \hat{y}_{obj} + (1 - y_{obj}) \cdot \log(1 - \hat{y}_{obj}); \text{ and} \quad \text{Equation 3}$$

$$L_{cls} = y_{cls} \cdot \log \hat{y}_{cls} + (1 - y_{cls}) \cdot \log(1 - \hat{y}_{cls}). \quad \text{Equation 4}$$

In Equation 3 and Equation 4, $y_{obj}$ represents whether a portrait object label exists, if the portrait object exists, $y_{obj}$ has a value of 1, and if the portrait object does not exist, $y_{obj}$ has a value of 0. $\hat{y}_{obj}$ represents the probability of existence of the portrait object predicted by the portrait detection network. $y_{cls}$ represents a class label, if the class is the portrait, $y_{cls}$ is 1, and if the class is not the portrait, $y_{cls}$ is 0. $\hat{y}_{cls}$ represents the probability that the class is the portrait predicted by the portrait detection network.

The detection box loss $L_{box}$ may be calculated by adopting a Generalized Intersection over Union (GIoU) loss function, and may be specifically calculated by the following Equation 5.

$$L_{box} = 1 - \frac{1}{U} + \frac{A - U}{A}. \quad \text{Equation 5}$$

In Equation 5, "I" represents an intersection area of a prediction box and a label box, "U" represents a union area of the prediction box and the label box, and "A" represents an area of a minimum circumscribed rectangle of the prediction box and the label box, wherein the prediction box is the portrait labeling box of the range of the head and shoulders of the portrait predicted in the training feature map, and the label box is the portrait labeling box in the fused fisheye image, and includes the second portrait labeling box of the portion of the annular image and the third portrait labeling box of the portion of the circular image.

Assuming that the training loss is "L", and the training loss "L" may be calculated by the following Equation 6.

$$L = \lambda_{obj} \cdot L_{obj} + \lambda_{cls} \cdot L_{cls} + \lambda_{box} \cdot L_{box}. \quad \text{Equation 6}$$

In Equation 6, $\lambda_{obj}$ represents the weight of $L_{obj}$, $\lambda_{cls}$ represents the weight of $L_{cls}$, and $\lambda_{box}$ represents the weight of $L_{box}$. After the training loss L is calculated, the updated weight value may be calculated by the back propagation algorithm.

When the number of training rounds reaches the preset number of rounds, the latest updated weight value is saved as an object weight value to output the trained portrait detection network. After acquiring the trained portrait detection network, the method for training the portrait detection model further includes step S04: testing the trained portrait detection model, In the embodiment, the step S04 of testing the trained portrait detection model, includes:

- S041: acquiring at least one planar verification image and at least one fisheye verification image as a comprehensive verification set;
- S042: inputting the images in the comprehensive verification set into the trained portrait detection model to acquire a testing feature map;
- S043: performing non-maximum suppression and decoding box processing on the testing feature map to obtain a detection result; and
- S044: acquiring an object parameter according to the detection result, the object parameter including at least one of detection indexes such as precision, recall and confidence.

In conjunction with FIG. 2, the apparatus 10 for training the portrait detection model further includes a testing module 14, and the testing module 14 may be configured for executing the methods in the steps S041, S042, S043, and S044. Namely, the testing module 14 is configured to acquire at least one planar verification image and at least one fisheye verification image as the comprehensive verification set, and input the images in the comprehensive verification set into the trained portrait detection model to acquire the testing feature map. The testing module 14 is further configured to perform non-maximum suppression and decode box processing on the testing feature map to obtain the detection result, and acquiring the object parameter according to the detection result, the object parameter including at least one of detection indexes such as precision, recall and confidence.

In one example, the first image and the second image acquired in step S01 are divided into a training set and a verification set in a preset proportion, the image of the training set is used for training the portrait detection model, and the image of the verification set is used for testing the trained portrait detection model. For example, planar images and fisheye images in the same number are taken from a data set as first images and second images, respectively, the planar images are divided according to a ratio of 9:1 of a plurality of first images to obtain a planar training set and a planar verification set, wherein the planar verification set contains at least one planar verification image. Similarly, the fisheye images are divided according to a ratio of 9:1 of a plurality of first images to obtain a fisheye training set and a fisheye verification set, wherein the fisheye verification set contains at least one fisheye verification image. Then the planar training set and the fisheye training set are integrated into a comprehensive training set, the planar verification set and the fisheye verification set are integrated into a comprehensive verification set, and the comprehensive training set and the comprehensive verification set are used for training and verifying the portrait detection model, respectively.

After inputting the images in the comprehensive verification set into the trained portrait detection model, the portrait detection model outputs the corresponding testing feature map. The detection result may be obtained by performing non-maximum suppression and decoding box processing on the testing feature map, object parameters such as detection indexes of precision, recall and confidence may be calculated for the detection result, and the performance of the portrait detection model may be determined according to the object parameters. The above mode of obtaining the detection result by the non-maximum suppression and decoding box processing, and the mode of calculating the object parameters such as detection indexes of precision, recall and confidence for the detection result are relatively mature calculation modes in the art, and will not be further explained herein.

In one example, when testing the trained portrait detection model, video images may be extracted from a video frame by frame, the video images may be input into the trained portrait detection model frame by frame to obtain the testing feature map, the detection result may be acquired according to the testing feature map, and the confidence may be acquired according to the detection result. If the confidence is greater than 0.5, the detection box of the testing feature map is output, and the detection box is the labeling box for labeling the portrait.

An embodiment of this application further provides a portrait detection method, and the portrait detection method includes:

- S08: training a portrait detection model by utilizing the method for training a portrait detection model; and
- S09: performing portrait detection by using the trained portrait detection model, wherein the method for training a portrait detection model of step S08 may be the method for training a portrait detection model in any one of the above embodiments.

The step S09 of performing portrait detection by using the trained portrait detection model, includes:

- S091: acquiring an image to be detected, the image to be detected including a planar image or a fisheye image;
- S092: inputting the image to be detected into the trained portrait detection model; and
- S093: acquiring a detection box output by the portrait detection model, the detection box being used for indicating a portrait in the image to be detected.

When training the portrait detection model, the adopted fused fisheye image is obtained by mapping the planar image and the fisheye image, and the fused fisheye image contains both the portrait features of the planar image and the portrait features of the fisheye image simultaneously, so that the trained portrait detection model may be applicable to the portrait detection for the planar image and the fisheye image simultaneously. In this way, whether the image to be detected input into the portrait detection model is the planar image or the fisheye image, the portrait detection model may output a relatively accurate detection box to indicate the portrait in the image to be detected.

Figure 10:
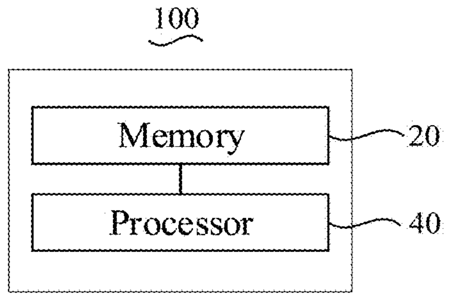
FIG. 10 is a schematic structural diagram of an electronic device according to an embodiment of this application.

Referring to FIG. 10, an embodiment of this application further provides an electronic device 100. The electronic device 100 includes a memory 20 and a processor 40. The memory 20 is configured for storing a computer program including a plurality of instructions, and the processor 40 may be configured for executing the computer program stored in the memory 20 to implement steps of the method for training a portrait detection model in the above embodiments, for example, executing the method for training a portrait detection model in the steps S01, S02, S03, and S04 in the above embodiments. The processor 40 may further be configured for executing the computer program stored in the memory 20 to implement steps of the portrait detection method in the above embodiments, for example, executing the portrait detection method in the steps S08 and S9 in the above embodiments, wherein the electronic device 100 includes, but is not limited to, a cell phone, a camera, a video camera, a notebook computer, a tablet computer, a smart watch, a monitoring device, an unmanned aerial vehicle, an unmanned vehicle, a smart furniture device, and the like.

Figure 11:
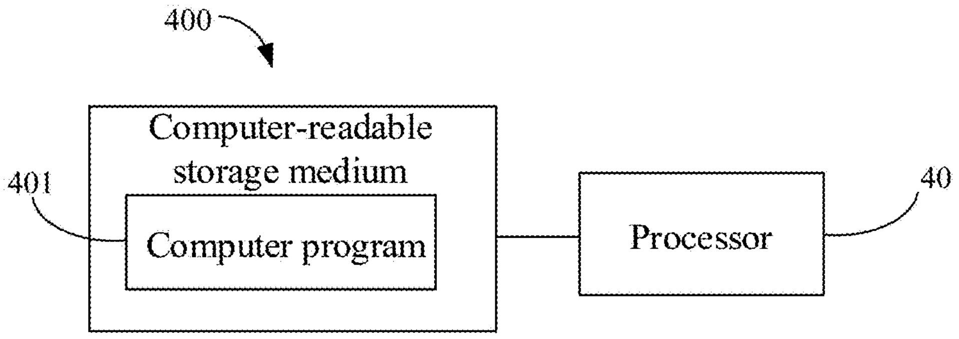
FIG. 11 is a schematic diagram of a connection state of a computer-readable storage medium and a processor according to an embodiment of this application.

Referring to FIG. 11, an embodiment of this application further provides a non-transitory computer-readable storage medium 400, which stores a computer program 401 including a plurality of instructions. When the computer program 401 is executed by one or more processors 40, the one or more processors 40 are caused to execute the method for training a portrait detection model according to any one of the above embodiments, for example, execute the method for training a portrait detection model in the steps 01, 02, 03 and 04 in the above embodiments; and the one or more processors 40 may also be caused to execute the portrait detection method according to any one of the above embodiments, for example, execute the portrait detection method in the steps 08 and 09 in the above embodiments.

In the description of this specification, the description with reference to the terms such as "embodiments", "in one example", and "exemplarily" means that a particular feature, structure, material, or characteristic described in conjunction with the embodiments or examples is included in at least one embodiment or example of this application. In this specification, schematic expressions of the above terms do not necessarily refer to the same embodiment or example. Furthermore, the particular feature, structure, material, or characteristic described may be combined in a suitable manner in any one or more embodiments or examples. In addition, incorporation and combination of different embodiments or examples and features of the different embodiments or examples described in this specification may be made by those skilled in the art without contradicting each other.

Any process or method described in a flowchart or otherwise described herein may be understood to represent a module, segment, or portion which includes one or more codes of executable instructions for implementing the steps of a particular logical function or process, and the scope of the preferred embodiments of this application includes additional implementations, wherein functions may be executed in substantially the same way or in a reverse order according to the involved functions, but not in the order illustrated or discussed, as will be understood by those skilled in the art to which the examples of this application pertain.

While the embodiments of this application have been shown and described above, it will be understood that the above embodiments are exemplary and are not to be construed as limiting this application, and variations, modifications, substitutions, and alterations to the above embodiments may be made by those ordinarily skilled in the art within the scope of this application.

What is claimed is:

1. A method for training a portrait detection model applied to an electronic device, the method comprising:

acquiring at least one first image and at least one second image, the first image being a planar image containing a portrait, and the second image being a fisheye image containing a portrait;

acquiring a fused fisheye image from the first image and the second image, the fused fisheye image containing the portraits in the first image and the second image; and training the portrait detection model by utilizing the fused fisheye image, and storing the trained portrait detection model in a storage medium of the electronic device;

wherein the acquiring the fused fisheye image from the first image and the second image comprises:

acquiring a preset fisheye area, the preset fisheye area comprising an annular area and a circular area, and the circular area being inscribed on an inner circumference of the annular area;

mapping the first image to the annular area to acquire an annular image;

mapping the second image to the circular area to acquire a circular image; and acquiring the fused fisheye image from the annular image and the circular image.

2. The method for training a portrait detection model according to claim 1, wherein the mapping the first image to the annular area to acquire an annular image comprises:

providing a first planar image, the first planar image being rectangular;

mosaicing a plurality of first images into the first planar image to acquire a second planar image, the second planar image comprising a first portrait labeling box; and performing coordinate conversion on pixels of the second planar image according to coordinate mapping equations to acquire the annular image, the annular image comprising a second portrait labeling box.

3. The method for training a portrait detection model according to claim 2, wherein the coordinate mapping equations comprise:

$$Xb = r\cos\left(\frac{\pi}{2} - \theta\right); \quad \text{Equation 1}$$

$$Yb = r\sin\left(\frac{\pi}{2} - \theta\right); \quad \text{Equation 2}$$

$$\theta = \frac{Xa}{2\pi R}2\pi = \frac{Xa}{R}; \text{ and} \quad \text{Equation 3}$$

$$r = Ya; \quad \text{Equation 4}$$

where θ represents a mapping polar angle, r represents a mapping polar radius, R represents a radius of the fused fisheye image, (Xa, Ya) represents a pixel point coordinate of the second planar image, and (Xb, Yb) represents a pixel point coordinate of the annular image.

4. The method for training a portrait detection model according to claim 2, wherein the performing coordinate conversion on pixels of the second planar image according to coordinate mapping equations to acquire the annular image comprises:

acquiring a first angular point coordinate, the first angular point coordinate representing an angular point of the first portrait labeling box;

performing coordinate conversion on the first angular point coordinate according to the coordinate mapping equations to acquire a second angular point coordinate;

acquiring a special-shaped labeling box according to the second angular point coordinate; and acquiring the second portrait labeling box according to a minimum circumscribed rectangle of the special-shaped labeling box.

5. The method for training a portrait detection model according to claim 1, wherein the mapping the second image to the circular area to acquire a circular image comprises:

preprocessing the second image to acquire a preprocessed image, a size of the preprocessed image being the same as a size of the circular area, and the preprocessing comprising scaling and clipping; and mosaicing the preprocessed image to the circular area to acquire the circular image.

6. The method for training a portrait detection model according to claim 1, wherein a ratio of a diameter of the circular area to a diameter of an outer ring of the annular area is in a range of [0.50, 0.75].

7. The method for training a portrait detection model according to claim 1, wherein the portrait detection model comprises a portrait detection network that has been pre-constructed, and the training the portrait detection model by utilizing the fused fisheye image comprises:

in a round of training, inputting the fused fisheye image into the portrait detection network to acquire a training feature map, acquiring training loss according to the training feature map, and calculating an updated weight value according to the training loss, the updated weight value being a weight parameter of a convolution kernel in the portrait detection network;

if a number of training rounds is less than a preset number of rounds, updating a preset weight value of the portrait detection network according to the updated weight value to acquire an updated portrait detection network, and performing a new round of training by utilizing the new fused fisheye image and the updated portrait detection network; and if the number of training rounds is greater than or equal to the preset number of rounds, using the latest updated weight value as an object weight value of the portrait detection network to output the trained portrait detection network.

8. The method for training a portrait detection model according to claim 7, wherein the portrait detection network comprises a focus layer, a depthwise separable convolution layer, a first-order convolution layer, a global maximum pooling layer and a fully connected layer, and the inputting the fused fisheye image into the portrait detection network to acquire a training feature map comprises:

inputting the fused fisheye image into the focus layer to acquire a focus image;

inputting the focus image into the depthwise separable convolution layer to acquire a first convolution image;

inputting the first convolution image into the first-order convolution layer to acquire a second convolution image, a number of channels of the second convolution image being greater than a number of channels of the focus image;

inputting the second convolution image into the global maximum pooling layer to acquire a first pooled image;

inputting the first pooled image into the fully connected layer to acquire a plurality of candidate features; and acquiring the training feature map according to the candidate feature with a maximum attention weight among the plurality of candidate features.

9. The method for training a portrait detection model according to claim 7, further comprising:

testing the trained portrait detection model, and the testing the trained portrait detection model comprising:

acquiring at least one planar verification image and at least one fisheye verification image as a comprehensive verification set;

inputting the images in the comprehensive verification set into the trained portrait detection model to acquire a testing feature map;

performing non-maximum suppression and decoding box processing on the testing feature map to obtain a detection result; and acquiring an object parameter according to the detection result, the object parameter comprising at least one of detection indexes being selected from the group of precision, recall and confidence.

10. A non-transitory computer-readable storage medium having a computer program stored thereon, wherein the computer program, when executed by one or more processors, cause the one or more processors to perform portrait detection by using a portrait detection model;

wherein the portrait detection model is trained by implementing the method for training a portrait detection model according to claim 1.

11. A portrait detection method, the method being applied to an electronic device to perform portrait detection by using a portrait detection model, the portrait detection model being trained by performing the following steps:

acquiring at least one first image and at least one second image, the first image being a planar image containing a portrait, and the second image being a fisheye image containing a portrait;

acquiring a fused fisheye image from the first image and the second image, the fused fisheye image containing the portraits in the first image and the second image; and training the portrait detection model by utilizing the fused fisheye image, and storing the trained portrait detection model in a storage medium of the electronic device;

wherein the acquiring the fused fisheye image from the first image and the second image comprises:

acquiring a preset fisheye area, the preset fisheye area comprising an annular area and a circular area, and the circular area being inscribed on an inner circumference of the annular area;

mapping the first image to the annular area to acquire an annular image;

mapping the second image to the circular area to acquire a circular image; and acquiring the fused fisheye image from the annular image and the circular image.

12. The portrait detection method according to claim 11, wherein the performing portrait detection by using a portrait detection model comprises:

acquiring an image to be detected, the image to be detected comprising a planar image or a fisheye image;

inputting the image to be detected into the trained portrait detection model; and acquiring a detection box output by the portrait detection model, the detection box being used for indicating a portrait in the image to be detected.

13. The portrait detection method according to claim 11, wherein the portrait detection model comprises a portrait detection network that has been pre-constructed, and the training the portrait detection model by utilizing the fused fisheye image comprises:

in a round of training, inputting the fused fisheye image into the portrait detection network to acquire a training feature map, acquiring training loss according to the training feature map, and calculating an updated weight value according to the training loss, the updated weight value being a weight parameter of a convolution kernel in the portrait detection network;

if a number of training rounds is less than a preset number of rounds, updating a preset weight value of the portrait detection network according to the updated weight value to acquire an updated portrait detection network, and performing a new round of training by utilizing the new fused fisheye image and the updated portrait detection network; and if the number of training rounds is greater than or equal to the preset number of rounds, using the latest updated weight value as an object weight value of the portrait detection network to output the trained portrait detection network.

14. The portrait detection method according to claim 13, wherein the portrait detection network comprises a focus layer, a depthwise separable convolution layer, a first-order convolution layer, a global maximum pooling layer and a fully connected layer, and the inputting the fused fisheye image into the portrait detection network to acquire a training feature map comprises:

inputting the fused fisheye image into the focus layer to acquire a focus image;

inputting the focus image into the depthwise separable convolution layer to acquire a first convolution image;

inputting the first convolution image into the first-order convolution layer to acquire a second convolution image, a number of channels of the second convolution image being greater than a number of channels of the focus image;

inputting the second convolution image into the global maximum pooling layer to acquire a first pooled image;

inputting the first pooled image into the fully connected layer to acquire a plurality of candidate features; and acquiring the training feature map according to the candidate feature with a maximum attention weight among the plurality of candidate features.

15. The portrait detection method according to claim 11, wherein the portrait detection model is trained by further performing a step of testing the trained portrait detection model, wherein the testing the trained portrait detection model comprising:

acquiring at least one planar verification image and at least one fisheye verification image as a comprehensive verification set;

inputting the images in the comprehensive verification set into the trained portrait detection model to acquire a testing feature map;

performing non-maximum suppression and decoding box processing on the testing feature map to obtain a detection result; and acquiring an object parameter according to the detection result, the object parameter comprising at least one of detection indexes being selected from the group of precision, recall and confidence.

16. An electronic device, comprising:

a memory configured to store a computer program; and a processor coupled to the memory and configured to execute the computer program stored in the memory to cause the electronic device to:

perform portrait detection by using a portrait detection model, wherein the portrait detection model is trained by performing the following steps:

acquiring at least one first image and at least one second image, the first image being a planar image containing a portrait, and the second image being a fisheye image containing a portrait;

acquiring a fused fisheye image from the first image and the second image, the fused fisheye image containing the portraits in the first image and the second image; and training the portrait detection model by utilizing the fused fisheye image, and storing the trained portrait detection model in the memory;

wherein the acquiring the fused fisheye image from the first image and the second image comprises:

acquiring a preset fisheye area, the preset fisheye area comprising an annular area and a circular area, and the circular area being inscribed on an inner circumference of the annular area;

mapping the first image to the annular area to acquire an annular image;

mapping the second image to the circular area to acquire a circular image; and acquiring the fused fisheye image from the annular image and the circular image.

17. The electronic device according to claim 16, wherein the perform portrait detection by using a portrait detection model comprises:

acquiring an image to be detected, the image to be detected comprising a planar image or a fisheye image;

inputting the image to be detected into the trained portrait detection model; and acquiring a detection box output by the portrait detection model, the detection box being used for indicating a portrait in the image to be detected.

18. The electronic device according to claim 16, wherein the portrait detection model comprises a portrait detection network that has been pre-constructed, and the training the portrait detection model by utilizing the fused fisheye image comprises:

in a round of training, inputting the fused fisheye image into the portrait detection network to acquire a training feature map, acquiring training loss according to the training feature map, and calculating an updated weight value according to the training loss, the updated weight value being a weight parameter of a convolution kernel in the portrait detection network;

if a number of training rounds is less than a preset number of rounds, updating a preset weight value of the portrait detection network according to the updated weight value to acquire an updated portrait detection network, and performing a new round of training by utilizing the new fused fisheye image and the updated portrait detection network; and if the number of training rounds is greater than or equal to the preset number of rounds, using the latest updated weight value as an object weight value of the portrait detection network to output the trained portrait detection network.

19. The electronic device according to claim 18, wherein the portrait detection network comprises a focus layer, a depthwise separable convolution layer, a first-order convolution layer, a global maximum pooling layer and a fully connected layer, and the inputting the fused fisheye image into the portrait detection network to acquire a training feature map comprises:

inputting the fused fisheye image into the focus layer to acquire a focus image;

inputting the focus image into the depthwise separable convolution layer to acquire a first convolution image;

inputting the first convolution image into the first-order convolution layer to acquire a second convolution image, a number of channels of the second convolution image being greater than a number of channels of the focus image;

inputting the second convolution image into the global maximum pooling layer to acquire a first pooled image;

inputting the first pooled image into the fully connected layer to acquire a plurality of candidate features; and acquiring the training feature map according to the candidate feature with a maximum attention weight among the plurality of candidate features.

* * * * *